United States Patent [19]

Venuto et al.

[11] Patent Number: 5,401,075
[45] Date of Patent: Mar. 28, 1995

[54] CLOSURE FOR A SEAT TRIM COVER

[75] Inventors: Dennis R. Venuto, St. Clair Shores; Amy R. Sutton, Canton, both of Mich.

[73] Assignee: Hoover Universal, Inc., Plymouth, Mich.

[21] Appl. No.: 194,216

[22] Filed: Feb. 9, 1994

[51] Int. Cl.⁶ .............................................. A47C 31/02
[52] U.S. Cl. ................... 297/218.2; 297/220; 297/228.13; 297/452; 297/59
[58] Field of Search .............. 297/218, 219.1, 220, 297/228.1, 228.13, 391, 396, 452.59, 452.60; 24/587

[56] References Cited

U.S. PATENT DOCUMENTS

| | | | |
|---|---|---|---|
| 2,100,557 | 11/1937 | Wintritz | 24/403 |
| 4,723,816 | 2/1988 | Selbert et al. | |
| 4,786,103 | 11/1988 | Selbert | 297/452.59 X |
| 4,987,658 | 1/1991 | Horita | 24/403 |
| 5,187,843 | 2/1993 | Lynch | 24/587 X |

FOREIGN PATENT DOCUMENTS 2826356  1/1980  Germany ............................ 297/220

*Primary Examiner*—Peter R. Brown
*Attorney, Agent, or Firm*—Harness, Dickey & Pierce

[57] ABSTRACT

A closure for an opening in a trim cover of an upholstered article. The closure includes a pair of elongated clips with one clip attached to one edge of the trim cover opening and forming a receiving pocket with an open end and the other attaching clip joined to an opposite edge of the trim cover opening and has a barb shape projection for insertion into the receiving pocket of the first clip. The barb shaped projection and the receiving pocket have mating shoulders that engage one another once the barb shaped projection is inserted into the receiving pocket to prevent release of the barb shaped projection and to hold the edges of the trim cover together whereby the opening in the trim cover is closed.

13 Claims, 2 Drawing Sheets

CLOSURE FOR A SEAT TRIM COVER

BACKGROUND AND SUMMARY OF THE INVENTION

The present invention relates to a closure for a seat trim cover and in particular to a closure especially suited for closing a seat trim cover around a halo opening in a seat back.

In trimming automotive seat assemblies with soft trim, a neat appearance and ease of manufacture are extremely important. Today's motor vehicle purchasers demand interior trim having clean and neat lines with raw material edges hidden from view. In order to reduce seat manufacturing cost, it is desirable to employ processes which employ low cycle times and which can be carried out with a high degree of accuracy.

The trimming of motor vehicle seat assemblies becomes particularly difficult when the seat is of the so-called "halo" type which has a large hole through the upper portion of the seat back. The front and rear sections of the trim cover must be connected around the peripheral edge of the seat back and further they must be joined within the hole through the seat back. One approach toward connecting the cover sections in the hole area is to sew them together in that region. This approach however, requires the front or rear trim cover to be fed through the hole and then spread out over the respective seat back portion before the front and rear trim covers are connected together around the periphery of the seat back. This operation is highly labor intensive and accordingly imposes cost penalties.

Another approach toward connecting the trim covers in the hole area is the use of a ridged ring member that is installed within the seat back hole. The ring member includes a flange portion which engages the trim cover on one side of the seat back and has another flange with a reversely bent edge channel. A brake-over strip affixed to the other trim cover fits within the channel formed by the bent flange and is retained therein to complete the trimming of a seat back hole. However, in some instances, the use of a-rigid ring member in a halo opening is undesirable and a softer appearance, such as that formed with a trim-to-trim attachment, is preferred.

Accordingly, it is an objective of the present invention to provide a closure for joining the front and rear trim covers together in the hole of a halo seat back after the trim cover has been applied to the seat back. This eliminates the labor intensive and costly process of sewing the front and rear trim covers together around the periphery of the seat back after the cover has been installed on the seat back.

With the closure of the present invention, the front and rear trim covers are sewn together about their peripheries, forming an envelope having an open end for insertion of the seat back into the envelope. The front and rear trim covers have openings for alignment with the hole in the seat back. Fastening clips are attached to the front and rear trim covers around the edges of the trim cover openings. The clips couple to one another to attach the front trim cover to the rear trim cover around the hole in the seat back. The attaching clip fastened to one trim cover has a projecting barb while the clip fastened to the other trim cover has a pocket for receiving the projecting barb. The pocket includes inwardly extending flanges which engage the barb and prevent its removal from the receiving pocket. Additionally, the attaching clip forming the pocket may also include a mounting hook to attach the clip to a supporting structure within the seat back, such as a seat back frame or a support wire mounted to the frame.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
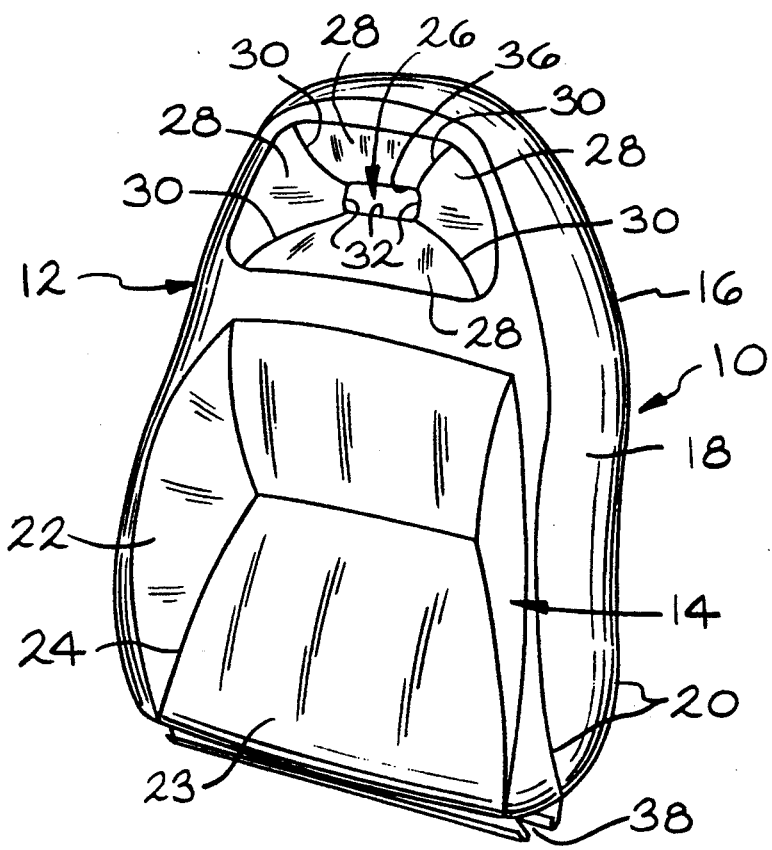
FIG. 1 is a front view of the seat back having the closure of the present invention.
Figure 2:
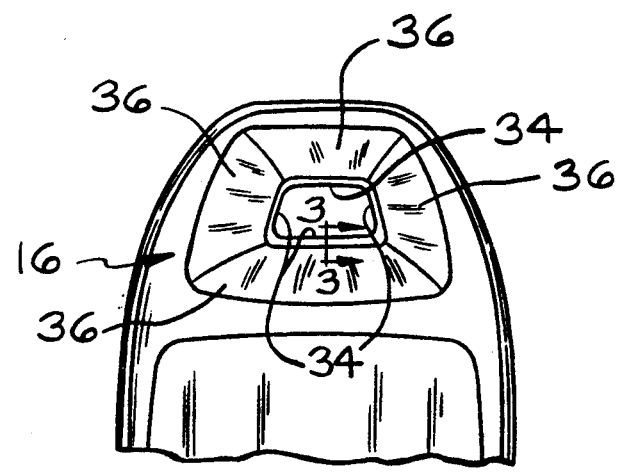
FIG. 2 is a rear view of the seat back shown in FIG. 1.

A seat back having a halo opening and a trim cover closed around the opening by the closure of the present invention is shown in FIGS. 1 and 2 and designated generally at 10. The seat back 10 includes a frame 76, shown in FIG. 3, covered by upholstery which includes a foam pad 78 and a trim cover 12 over the foam pad. The trim cover 12 includes a front trim cover 14 and a back trim cover 16 which are joined together by a side trim cover 18. The front, rear and side trim covers are joined together by a plurality of sewn seams 20 and may each be constructed of several pieces of a sheet material joined together by seams. For example, the front trim cover 14 is formed in part by pieces 22 and 23 joined together by seam 24.

The seat back 10 is of the so-called "halo" type which has a large hole 26 through the upper portion of the seat back. In the seat back shown in FIG. 1, the hole 26 is generally rectangular in shape. The front trim cover 14, surrounding the hole 26, is made of four pieces 28 joined together by diagonal seams 30 which radiate from the corners of the hole 26. The front trim cover includes an opening formed by the edges 32 of the pieces 28. These edges 32 are attached to edges 34 of corresponding pieces 36 of the rear trim cover 16 shown in FIG. 2 by the closure of the present invention.

The trim cover 12 is constructed by sewing the front, rear and side trim covers together, forming an envelope having an open lower end 38. The trim cover envelope is then installed over the seat back frame and foam pad by inserting the frame and pad into the envelope, through the open end 38. Once the frame is covered by the trim cover 12, the front and rear trim covers are attached to one another around the hole 26.

Figure 3:
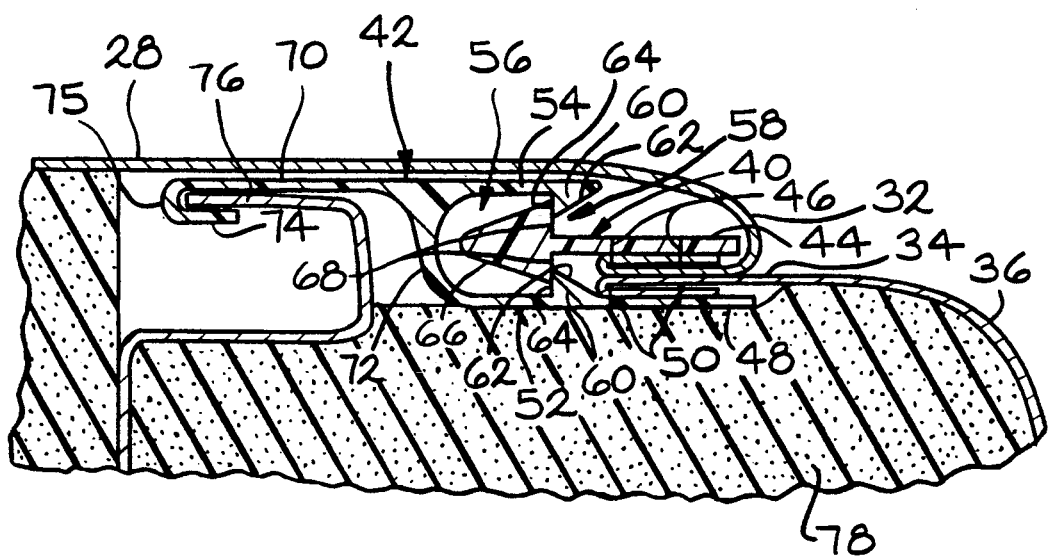
FIG. 3 is a sectional view showing the trim covers closed around the halo opening with the closure of the present invention as seen from substantially the line 3—3 of FIG. 2.

The closure of the present invention is shown in FIG. 3 and consists of a pair of attaching clips 40 and 42. The attaching clips 40 and 42 are elongated plastic extrusions which are attached to the edges 32 and 34 of the front and rear trim cover pieces 28 and 36 respectively. The attaching clip 40 has a flat joining portion 44 which is sewn to the trim cover edge 32 by a pair of seams 46. Likewise, the clip 42 has a flat joining portion 48 which is sewn to the trim cover edge 36 by a pair of seams 50.

The attaching clip 42 has a pair of spaced legs 52 and 54 which form a receiving pocket 56 having an open end 58. The flat portion 48 of the clip 32 forms the distal end of the leg 52 which extends beyond the open end 58 of the receiving pocket. At the open end 58, the legs 52 and 54 have inwardly directed flanges 60 having ramped surfaces 62 and forming shoulders 64 facing the interior of the receiving pocket 56.

The attaching clip 40 includes an arrow shaped barb 66 along one edge of the flat portion 44 which is sized so as to fit within the receiving pocket 56 by deflection of the legs 52 and 54 away from one another. The barb 66 has shoulders 68 which catch on the shoulders 64 of the flanges 60 to retain the barb within the receiving pocket.

The trim cover 28 extends from the attaching clip 40 to the right as shown in FIG. 3 and overlies the trim cover 36 which also extends to the right from attaching clip 42. The result is a finished appearance of the trim cover 28 overlying the trim cover 36. There is no exposed attaching hardware, thus resulting in a soft trim-to-trim appearance in the seat back hole 26.

The attaching clip 42 has an extension 70 from the closed end 72 of the receiving pocket which has a reverse bent end 74 forming a hook 75 for mounting the attaching clip 42 to the frame 76 or other structure in the seat back 10. Once the clip 42 is installed on the frame, compression of the foam pad 78 by the trim cover causes the attaching clip 42 to be urged to the right in FIG. 3, seating the hook 75 onto the frame 76.

It may be possible to construct the closure with two clips that fasten to one another without being attached to the frame or a supporting structure of the seat back. In such a case, the attaching clip 42 would not have the extension 70 forming the hook 75.

The trim cover around the hole 26 in seat back 10 is closed by four pairs of attaching clips 40 and 42. The four edges 32 of the trim cover pieces 28 will each have a clip 42 sewn thereto. The edges 34 of trim cover pieces 36 will each have a clip 40 sewn thereto. The clips are elongated plastic extrusions and extend along most of the length of edges 32 and 34. To facilitate assembly, the clips are shorter than the edges and do not extend completely to the corners of the hole 26 formed by seams 30.

The closure of the present invention provides an easily assembled closure of the front and rear trim covers around a halo opening in a seat back. The closure results in a trim-to-trim finish without the rigid ring shown in the prior art. In addition, the trim cover is closed around the halo opening after assembly of the cover over the seat back. This allows the cover to be assembled around its periphery into an envelope before it is installed on the seat back. This avoids the need for difficult and time consuming sewing of the trim cover after being wrapped around the seat back frame and cushion. While the closure of the present invention has its greatest utility around a seat back halo opening, the closure can also be used in other locations where the seat cover must be closed after assembly and a trim-to-trim appearance is desired.

It is to be understood that the invention is not limited to the exact construction illustrated and described above, but that various changes and modifications may be made without departing from the spirit and scope of the invention as defined in the following claims.

We claim:

1. A closure for a trim cover of an upholstered article, the upholstered article having an internal support structure covered by the trim cover and the trim cover having a pair of elongated edges to be attached to one another after the trim cover is placed over the internal structure, said closure comprising:

a first elongated attaching clip joined to one of said pair of elongated edges and extending longitudinally along said one of said pair of edges, said first attaching clip having a receiving pocket formed by a pair of transversely spaced, longitudinally extending legs, said receiving pocket having an elongated open end, and said legs having flanges that extend toward one another into said pocket at said open end; and a second elongated attaching clip joined to the other of said pair of edges and extending longitudinally along said other of said pair of edges, said second attaching clip having an elongated barb shaped projection for insertion into said receiving pocket of said first elongated attaching clip, said barb shaped projection having shoulders that engage the flanges of the receiving pocket once said barb shaped projection is inserted therein to positively prevent release of the barb shaped projection to hold said edges together whereby said pair of edges in said trim cover are attached to one another.

2. The closure of claim 1 wherein said first elongated attaching clip further comprises means for mounting said first elongated attaching clip to the internal support structure of the upholstered article.

3. The closure of claim 2 wherein said means for mounting said first attaching clip to the internal supporting structure of the upholstered article includes an extending flange having a return bent configuration forming a hook.

4. The closure of claim 1 wherein said first elongated attaching clip includes a first joining portion where said first attaching clip is joined to one of said edges, said first joining portion being formed by a distal end of one of said legs forming said receiving pocket extending beyond said open end of said receiving pocket whereby said receiving pocket opens in a direction toward the trim cover edge joined to said first attaching clip.

5. The closure of claim 4 wherein said second elongated attaching clip further comprises a second joining portion where said second attaching clip is joined to the other of said trim cover edges and said barb shaped projection extends from said second joining portion whereby when said barb shaped projection is inserted into said receiving pocket said second joining portion is disposed adjacent to said first joining portion.

6. An upholstery cover for a seat back of the type having a hole formed therethrough, said seat back having a front side and a rear side, said upholstery cover comprising:

front and rear cover sections for covering the front and rear sides of the seat back respectively, each said cover section having an opening for alignment with said seat back hole and each said cover section having an edge surrounding said opening, said front and rear cover sections also having peripheral edges and being assembled together along a substantial portion of said peripheral edges to form an envelope having an open end for insertion of said seat back into said envelope;

an elongated front attaching clip attached to said front cover section along a portion of said front cover section edge surrounding said opening, said front attaching clip having a substantially uniform cross sectional shape along the length thereof; and an elongated rear attaching clip attached to said rear cover section along a portion of said rear cover edge surrounding said opening, said rear attaching a clip having a substantially uniform cross sectional shape along the length thereof, and said front and rear attaching clips having cooperating means for joining said front and rear attaching clips to one another to join said front and rear cover sections together in said seat back hole.

7. The upholstery cover of claim 6 wherein said seat back includes a support structure and one of said front and rear attaching clips includes means for mounting said one clip to the support structure of the seat back.

8. The upholstery cover of claim 7 wherein said means for attaching said one clip to the support structure of the seat back includes an extending flange having a return bent configuration forming a hook.

9. The upholstery cover of claim 6 wherein said means for joining said front and rear attaching clips to one another includes projecting means on one of said attaching clips and receiving means on the other of said attaching clips for receiving said projecting means and positively holding said projecting means to join said attaching clips to one another.

10. The upholstery cover of claim 6 wherein:
one of said attaching clips includes a joining portion where said one attaching clip is joined to one of said cover sections and a receiving pocket having on open end formed by a pair of spaced legs having inwardly directed flanges that extend toward one another at said open end; and
the other of said attaching clips includes a joining portion where said other attaching clip is joined to the other of said cover sections and a barb shaped projection extending from said joining portion for insertion into said receiving pocket, said barb shaped projection having shoulders that engage the flanges of the receiving pocket once inserted therein to positively prevent release of the barb shaped projection whereby said receiving pocket and said barb shaped projection form said means for joining said front and rear attaching clips to one another.

11. The upholstery cover of claim 10 wherein said joining portion of said one attaching clip is formed by a distal end of one of said legs forming said receiving pocket extending beyond said open end of said receiving pocket whereby said receiving pocket opens in a direction toward the cover section joined to said one attaching clip.

12. The upholstery cover of claim 10 wherein said seat back includes a support structure and said one attaching clip includes an extending flange having a bent return configuration forming a hook for mounting said one attaching clip to the support structure of the seat back, said hook having an opening which faces toward the said joining portion of said one attaching clip whereby tension in said one cover section joined to said one attaching clip draws said hook onto the support structure.

13. The upholstery cover of claim 6 further comprising a plurality of said front attaching clips attached to said front cover section along portions of said front cover section edge surrounding said opening and an equal number of said a rear attaching clips attached to said rear cover section along portions of said rear cover section edge surrounding said opening.

* * * * *